P. MYRHOLM.
HAY RACK.
APPLICATION FILED JUNE 17, 1910.

980,323.

Patented Jan. 3, 1911.

3 SHEETS—SHEET 1.

Witnesses
E. Larson
Charles A. Wilson

Inventor
Peder Myrholm
By Beeler & Robb
Attorneys

P. MYRHOLM.
HAY RACK.
APPLICATION FILED JUNE 17, 1910.
980,323.
Patented Jan. 3, 1911.
3 SHEETS—SHEET 3.
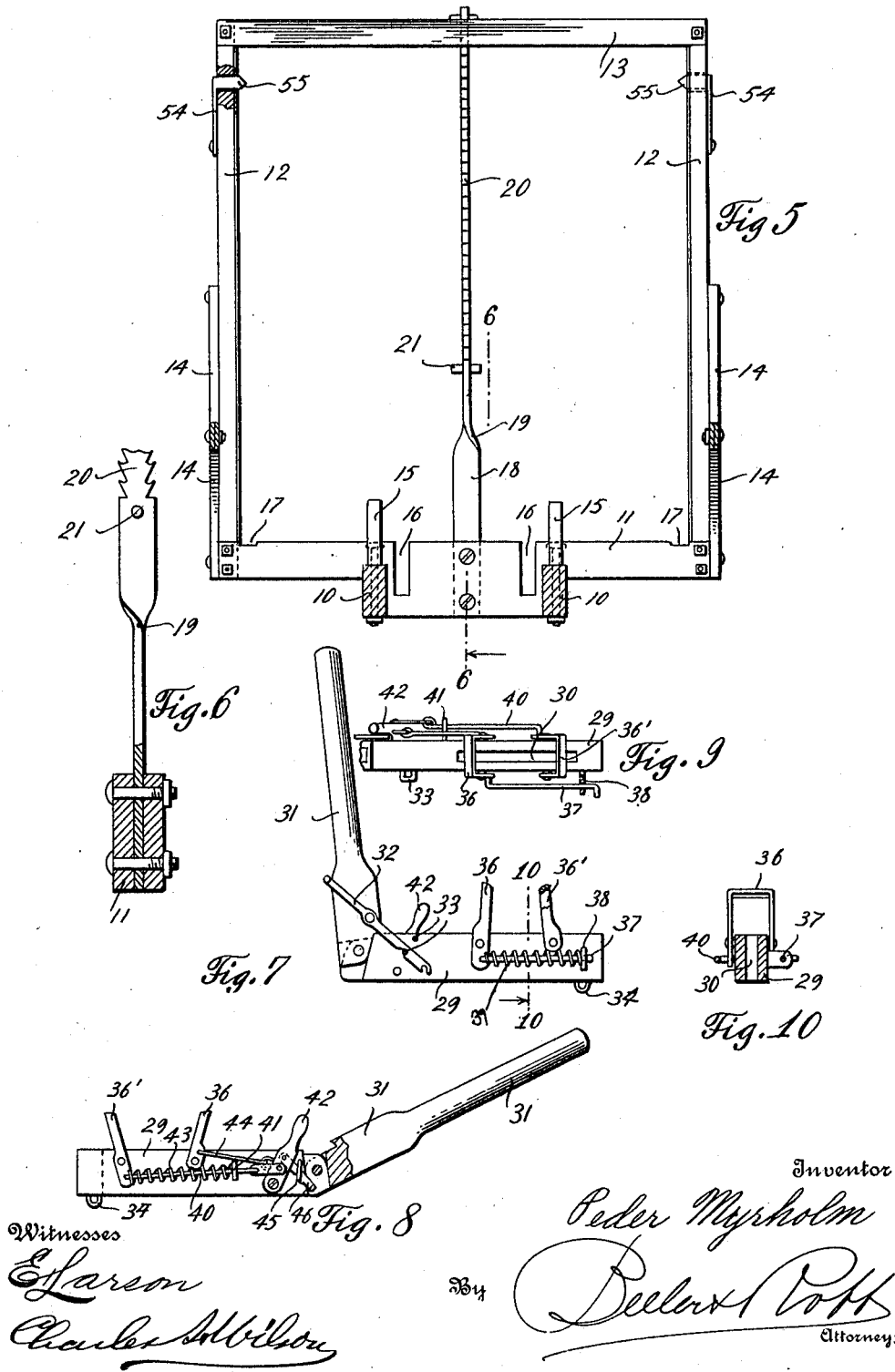

UNITED STATES PATENT OFFICE.

PEDER MYRHOLM, OF VOLGA, SOUTH DAKOTA.

HAY-RACK.

980,323.

Specification of Letters Patent.

Patented Jan. 3, 1911.

Application filed June 17, 1910. Serial No. 567,519.

*To all whom it may concern:*

Be it known that I, PEDER MYRHOLM, a citizen of the United States, residing at Volga, in the county of Brookings and State of South Dakota, have invented certain new and useful Improvements in Hay-Racks, of which the following is a specification.

This invention relates to improvements in hay racks and is designed to construct a hay rack which is adapted to normally be retained on a wagon body, and which when it is desired to remove the hay therefrom to a loft or stack, the same may be raised to the level of said stack, thus eliminating the necessity of tossing the hay upwardly.

It contemplates the construction of a device of this nature which will readily be raised and lowered, and which also will be simple, durable, and quickly operated.

With the above and other objects in view, this invention consists in the combination, construction, and arrangement of parts, all as hereinafter more fully described, claimed, and illustrated in the accompanying drawings, wherein—

Figure 1:
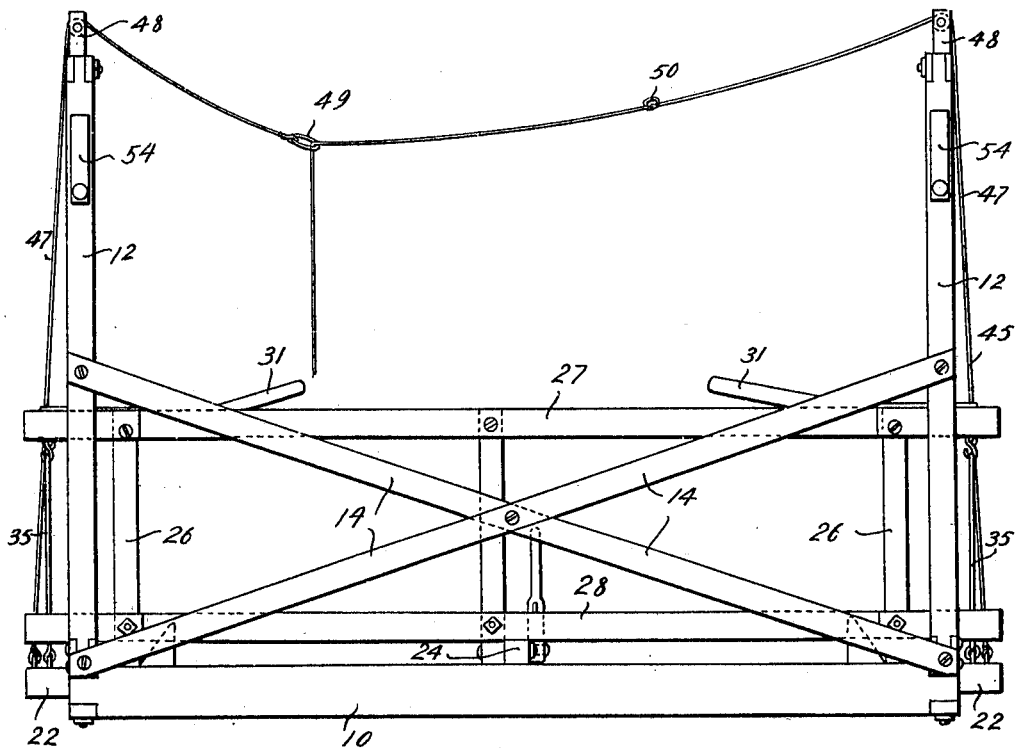
Figure 2:
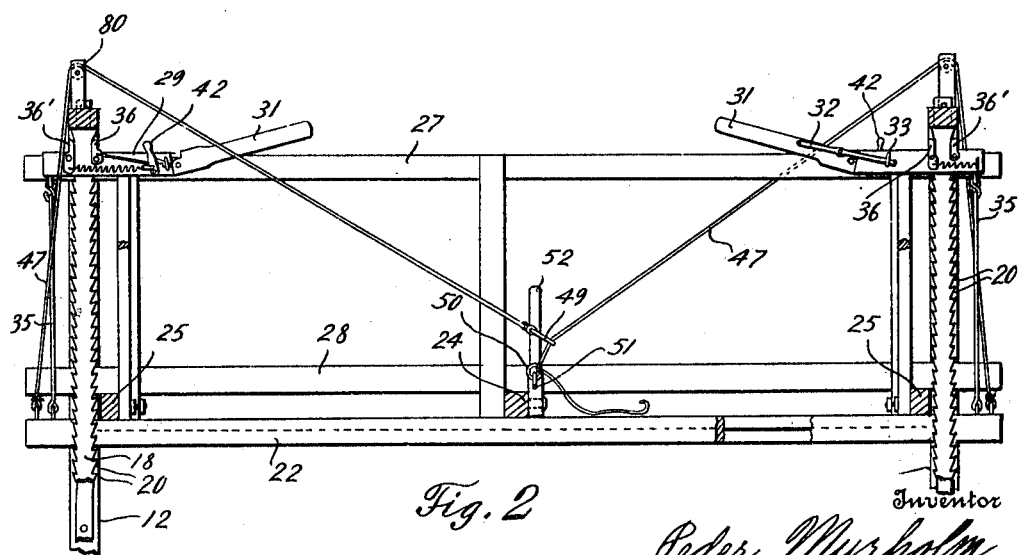
Figure 3:
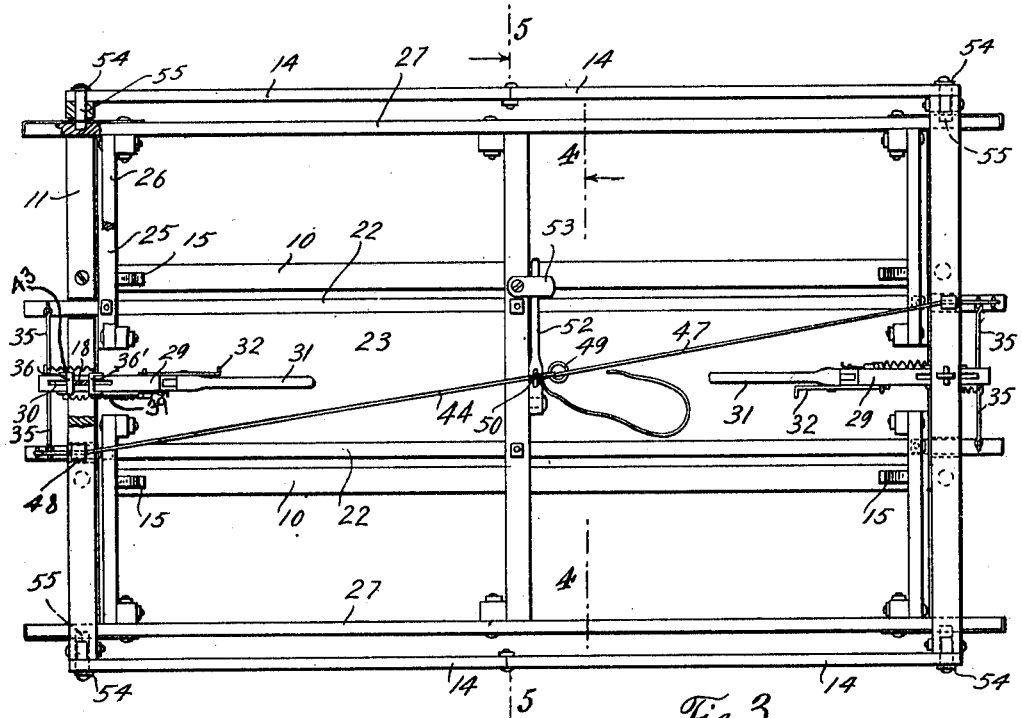
Figure 4:
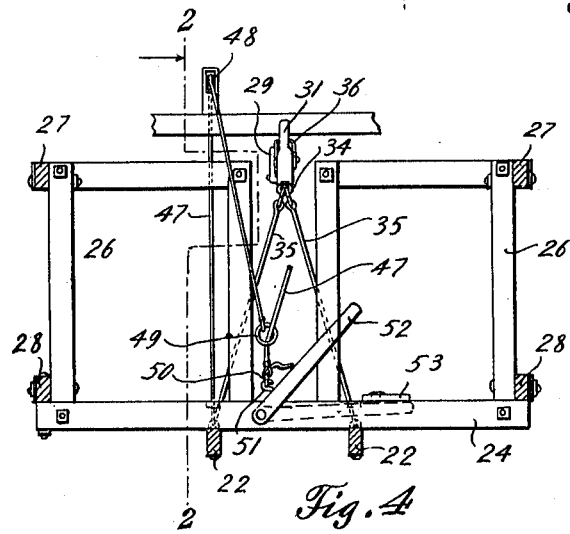

Figure 1 is a side elevation of a hay rack constructed in accordance with the present invention, illustrating the elevating frame lowered; Fig. 2 is a longitudinal section taken along the line 2—2 of Fig. 4; Fig. 3 is a top plan view of the present invention, parts thereof being broken away; Fig. 4 is a transverse section taken through the elevating frame along the line 4—4 of Fig. 3; Fig. 5 is a similar section taken through the main supporting frame along the line 5—5 of Fig. 3, Fig. 6 is a vertical section taken through the base of one of the toothed bars along the line 6—6 of Fig. 5; Fig. 7 is a side elevation of one of the elevating levers; Fig. 8 is a similar view partly in section taken from the opposite side thereof; Fig. 9 is a top plan view thereof, and Fig. 10 is a vertical section taken along the line 10—10 of Fig. 7.

The hay rack forming the subject-matter of the present invention resides in the provision of a main supporting frame adapted to normally rest upon the wagon body or the like, having at each terminal thereof vertically extending frames in which are carried vertical rack bars. An inner elevating frame is adapted to reciprocate in the main supporting frame in guides provided therefor and has secured thereto at each terminal an elevating mechanism which comprises a lever adjustable vertically on the rack bars carried at the terminals of each supporting frame. Means is provided whereby the entire device may be lowered after the load has been removed when the same is in an elevated position.

In carrying out the present invention a main supporting frame is provided comprising a pair of central longitudinal supports 10 which have at each extremity thereof the transverse bar 11, said bar supporting at each terminal thereof the vertical supports 12 which carry at their upper terminals the transverse bar 13, said support 12 and bar 13 constituting the vertical end frames of the main supporting frame. These vertical end frames are connected by the crossed braces 14 and are thereby rigidly retained in their normal position. The longitudinal bars 10 are provided adjacent to the transverse bars 11 with the vertically extending guides 15, the faces of which toward the transverse bars 11 being curved, said guides being so located to insure the accurate vertical movement of the elevating frame. A recess or depression 16 is located in the transverse end bars 11 adjacent to the inner face of each of the longitudinal bars 10 and likewise provides guides for the elevating frame and means whereby the same may be retained rigidly in position while being loaded. A small recess 17 is located adjacent to each of the vertical supports 12 and is provided for the same purpose as the recess 16.

Interposed centrally between the transverse bars 11 and 13 is the bar 18 which is provided adjacent to the bar 11 with the twist 19 so that the upper portion of the bar may be at right angles to the lower portion. The upper portion of the bar 18 above the twist 19 is provided with a series of ratchet teeth 20, the upper side of each tooth being approximately horizontal while the lower side thereof slopes thereto. A transverse pin 21 is located adjacent to the lower terminal of the portion carrying the teeth 20 and is thus provided to retain the elevating mechanisms in their proper positions.

The elevating frame comprises the central longitudinal bars 22 which are adapted to rest normally parallel to and between the longitudinal bars 10 of the main supporting frame, said central longitudinal bars 22 projecting through the end frames of the main supporting frame and are adapted to rest normally in the recesses 16 thereof. A platform 23 is interposed between the longitudinal bars 22 and carries the central transverse bar 24. Adjacent to the terminals of the longitudinal bars 22 are the transverse end bars 25, each of which supports the spaced end frames 26, said end frames being connected by the longitudinal bars 27 at their upper terminal and the longitudinal bars 28 at their lower terminals, said bars 28 adapted to rest upon the transverse bars 24 and 25 while the bars 22 are disposed below the same.

It will be understood that the main supporting frame is carried by a wagon while hay or the like is disposed in the elevating frame. When the elevating frame is raised within the supporting frame the hay is likewise raised to any level as desired after which the hay may be removed as desired.

The elevating mechanism comprises a bar 29 adapted to reciprocate on the upper portion of each of the rods 18 having the central elongated opening 30 therethrough for the reception of said rod or bar. A lever 31 is pivoted to the inner terminal of the bar 29 and is provided with a catch 32 pivotally connected thereto which is adapted to project through the eye 33 carried by the adjacent terminal of the bar 29 and retain the lever 31 in various positions. The opposite terminal of the bar 29 is provided with an eye 34 to which is connected the links 35 which are interposed between the terminals of the bars 22 and the terminal of the bar 29. Thus it will be seen that by operating the bar 29 upon the toothed portion of the bar 18, the elevating frame heretofore more fully referred to will likewise be operated vertically.

Adjacent to the terminals of the opening 30 of the bar 29 are pivoted U-shaped pawls 36 and 36', one arm of each pawl being longer than the remaining arm. The elongated arm of the pawl 36 is connected to a rod 37 which projects through an orificed stud 38 carried by the bar 29 and is bent angularly to retain the same therein, said rod being surrounded by a spring 39 interposed between the stud 38 and the lower terminal of the elongated arm of the pawl, said spring adapted to normally force the pawl into operative engagement with the teeth 20 located on one side of one of the bars 18. The opposite pawl 36' has pivotally connected thereto a similar rod 40 which projects through an orificed stud 41 carried by the bar 29 and is pivotally connected to a releasing lever 42. A spring 43 is interposed between the lower terminal of the elongated arm of the pawl 36' and the collar 41 and is adapted to force the pawl into operative engagement with the pawl on the opposite side of the bar 18 to the teeth engaged by the pawl 36. From this construction it will readily be seen that as the lever 31 is operated the pawls will be caused to alternately slide over the teeth, thereby forming an alternate fulcrum for the rod 29 and lever 31, thereby providing a secure means for raising the elevating frame hereinbefore described.

To provide a means whereby the pawls may be disengaged from the teeth of the rods 18 the short arm of the pawl 36 is connected by a link 44 to the releasing lever 42; thus when the lever 42 is moved toward the lever 31 the upper terminals of the pawls will be withdrawn from engagement with the teeth 20 as illustrated in Fig. 8. An eye 45 is carried adjacent to the rear terminal of the lever 42 and is adapted to secure the catch 46 when the pawls are released from their engagement with the teeth 20.

To provide a means whereby the weight of the elevating frame may be removed from the bars 29 when it is desired to lower the same a rope 47 is secured to each terminal of the elevating frame and extends upwardly over a pulley 48 of the end frame of the supporting frame, one of said ropes being provided with a ring 49 at the terminal thereof while the opposite rope is provided with a ring 50 spaced from the terminal thereof, the ring 50 adapted to be drawn through the ring 49 and engaged by the hook 51 carried by the lever 52 which is pivoted to the transverse bar 24 of the elevating frame. Thus it will be seen that as the lever 52 is pressed outwardly the ropes 47 will raise the elevating frame slightly and remove the weight from the bars 29, thus permitting the releasing lever 42 to be operated and the elevating frame lowered through the instrumentality of the ropes 47. A plate 53 is pivoted to the bar 24 adjacent to the terminal of the lever 52 and is adapted to normally retain the same in the position set forth in Fig. 3.

In order to aid in retaining the inner or elevating frame in a raised position, a spring 54 is mounted on the outer side of each of the uprights 12 adjacent to the upper terminals thereof, and is provided with a portion 55 which projects through said uprights and is adapted to engage a recess in the inner frame, said projecting portion being beveled on both sides thereof.

Having thus fully described my invention, what is claimed as new is:

1. In a device of the class described, the combination with a supporting frame, of toothed bars located centrally at the terminals of said supporting frame, elevating mechanisms adapted to operate on said toothed bars, an elevating frame carried by said elevating mechanisms, means whereby said elevating frame may be retained in an elevated position independently of the elevating mechanisms, and means operable through said last named means whereby said elevating frame may be lowered independently of said elevating mechanisms.

2. In a device of the class described, the combination with a main supporting frame, having vertically extending toothed bars at each terminal thereof, elevating mechanisms adapted to operate on said toothed bars, means whereby said elevating mechanisms may be released from engagement with said toothed bars, an elevating frame adapted to reciprocate vertically in said supporting frame, means whereby said elevating mechanisms may raise said elevating frame, and means whereby said frame may be lowered independently of said elevating mechanisms when the latter are disengaged from the toothed bars.

3. In a device of the class described, the combination with a supporting frame, of a toothed vertical bar at each terminal thereof, a bar adapted to reciprocate vertically on each of said toothed bars, having oppositely disposed pawls thereon adapted to engage the teeth of each bar, operating levers for said bars carrying the pawls, an elevating frame mounted in said supporting frame for vertical movement, and means whereby said pawl carrying bars may raise and lower said elevating frame.

4. In a device of the class described, the combination with a main supporting frame, guides formed in said main supporting frame, an elevating frame adapted to operate on said guides, toothed bars located centrally at the ends of said supporting frame, ratchet elevating mechanisms adapted to reciprocate on said toothed bars, and means whereby the movement of said ratchet elevating mechanisms will raise said elevating frame.

5. In a device of the class described, the combination with a main supporting frame, guides formed in said main supporting frame, an elevating frame adapted to operate on said guides, toothed bars located centrally at the ends of said supporting frame, ratchet elevating mechanisms adapted to reciprocate on said toothed bars, means for releasing said ratchet elevating mechanisms from engagement with said toothed bars, and means whereby said elevating frame may be lowered independently of said elevating mechanisms.

6. In a device of the class described, the combination with a main supporting frame, guides formed in said main supporting frame, an elevating frame adapted to operate on said guides, toothed bars located centrally at the ends of said supporting frame, ratchet elevating mechanisms adapted to reciprocate on said toothed bars, means for releasing said ratchet elevating mechanisms from engagement with said toothed bars, means whereby said elevating frame may be retained in an elevated position, and means whereby said elevating frame may be retained in an elevated position independently of said last named means and said raising mechanisms may be lowered thereby.

7. In a device of the class described, the combination with a main supporting frame, guides formed in said main supporting frame, an elevating frame adapted to operate on said guides, toothed bars located centrally at the end of said supporting frame, ratchet elevating mechanism operating on said toothed bars, flexible members secured to the terminals of said elevated frame and extending over the end pieces of said main supporting frame, and means centrally carried by said elevating frame whereby the same may be retained in an elevated position independently of said elevating ratchets.

8. In a device of the class described, the combination with a main supporting frame, guides formed in said main supporting frame, an elevating frame adapted to operate on said guides, toothed bars located centrally at the end of said supporting frame, ratchet elevating mechanism operating on said toothed bars, flexible members secured to the terminals of said elevated frame and extending over the end pieces of said main supporting frame, a lever pivotally mounted centrally on said elevated frame, means whereby said flexible members may be secured to said lever, and a catch carried by said elevating frame whereby said lever may be retained in a horizontal position, thus retaining said frame in an elevated position independently of said elevating mechanism.

In testimony whereof I affix my signature in presence of two witnesses.

PEDER MYRHOLM.

Witnesses:
ALFRED MARTENSON,
GEO. G. NELSON.